United States Patent

Bien et al.

[11] 3,962,744
[45] June 15, 1976

[54] LOCKING AND SEALING WASHER APPARATUS

[75] Inventors: Alfred A. Bien, West Bloomfield; Robert W. Glover, Detroit, both of Mich.

[73] Assignee: Chrysler Corporation, Highland Park, Mich.

[22] Filed: Nov. 13, 1974

[21] Appl. No.: 523,305

[52] U.S. Cl. .................................. 15/250.34; 151/7
[51] Int. Cl.² ........................................... B60S 1/34
[58] Field of Search .................. 15/250.32, 250.34; 403/254, 192–197; 151/7, 8, 14.5

[56] References Cited
UNITED STATES PATENTS

| | | | |
|---|---|---|---|
| 447,697 | 3/1891 | Pollard | 151/7 |
| 1,916,544 | 7/1933 | Whitted | 15/250.34 |
| 2,259,790 | 10/1941 | Auten | 15/250.27 X |
| 2,990,866 | 7/1961 | Macy et al. | 151/14.5 |
| 3,189,075 | 6/1965 | Jobe | 151/7 |

*Primary Examiner*—Peter Feldman
*Attorney, Agent, or Firm*—Talburtt & Baldwin

[57] ABSTRACT

Windshield wiper coupling, including a tubular member having a threaded portion extending through a hole in an automotive vehicle structural part. A rotatable member extends through the tubular member and is connected at opposite ends to the wiper and to an actuating assembly. A washer surrounds a threaded portion of the tubular member and is and has a deformable finger in a slot in the threaded portion. A nut deforms the deformable portion when tightened on the threaded portion.

3 Claims, 7 Drawing Figures

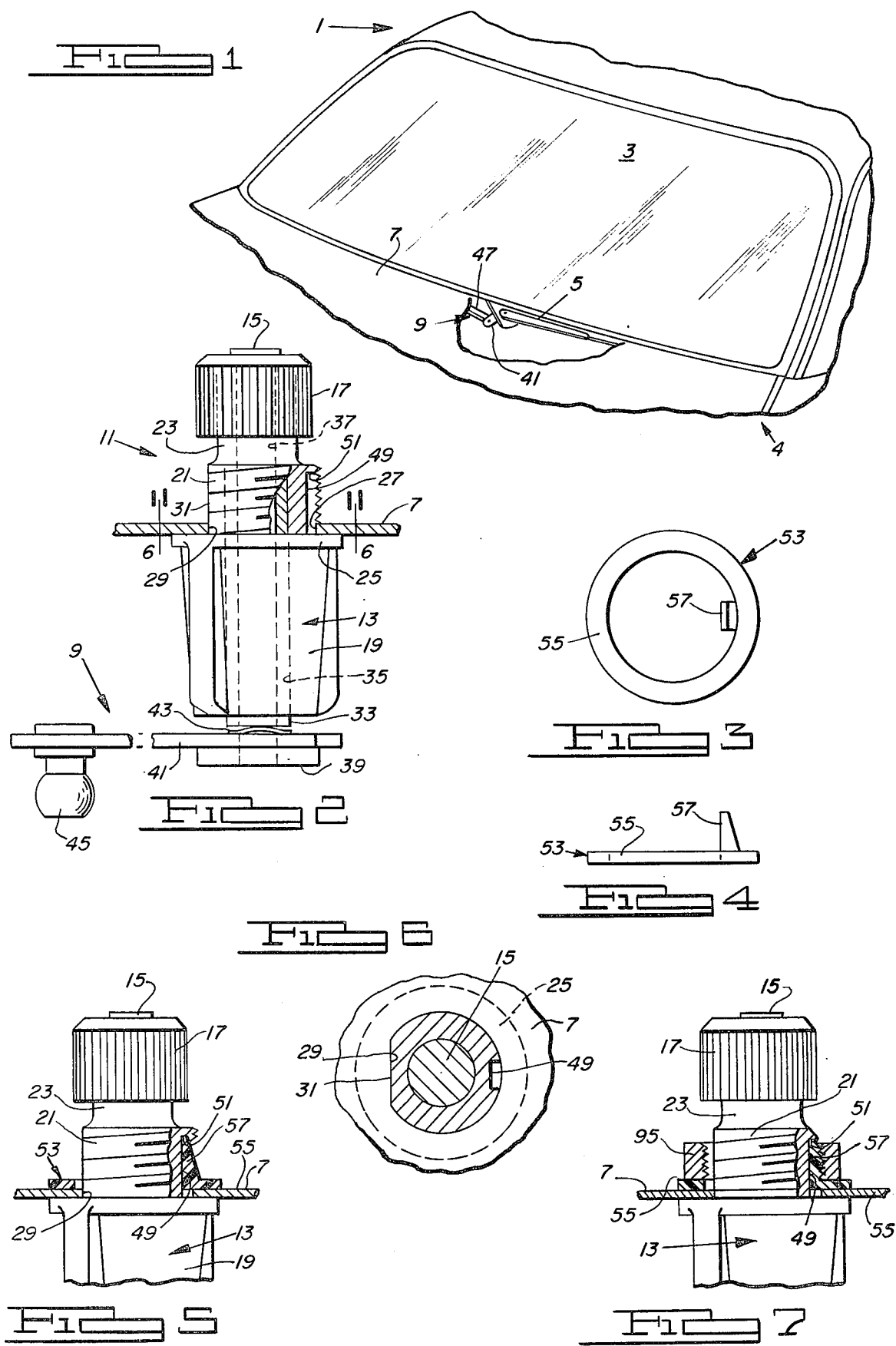

LOCKING AND SEALING WASHER APPARATUS

BACKGROUND OF THE INVENTION

This invention relates to a windshield wiper connection for an automobile, and more particularly, to a windshield wiper connection having a locking and sealing washer.

Automobile windshield wipers are connected to the sheet metal adjacent the windshield of the vehicle by a linkage and fastening construction which includes a link connected to the lower end of a shaft which extends through a collar or the like secured through an opening in sheet metal adjacent the windshield. A knurled knob or cap is connected to the upper end of the shaft and is adapted to receive the end of a windshield wiper assembly. The collar is normally secured to the sheet metal by a nut which clamps the body sheet metal between a flange on the collar and a washer located between the sheet metal and the nut.

A snap ring is normally located on the outside of the nut to prevent loosening of the nut beyond a predetermined point. A sealing material is normally applied to the collar adjacent the opening in the body sheet metal to prevent the leakage of water through the opening. Thus, it is necessary to use a washer, a sealer, and a snap ring in present constructions. With such components it was possible for an assembly line worker to assemble the collar through the sheet metal opening and fasten the nut on the other side thereof by hand. Occasionally, these hand fastened devices would loosen, causing the windshield apparatus to malfunction. Moreover, in assembling these devices through the opening in the sheet metal it was necessary for an operator to hold the lower portion of the collar assembly as the nut was attached to the upper end thereof. This required both hands and also on occasion would require the use of a special tool to hold the lower side of the collar while the nut was fastened on the upper end of the collar. The present invention relates to this general type of apparatus.

SUMMARY OF THE INVENTION

Briefly, this invention comprises a coupling or fastening device having a threaded portion for receiving a nut, the threaded portion having a slot therein for receiving a finger of a resilient washer, the finger being deformable by the nut when the latter is applied to the threaded portion to prevent manual or inadvertent removal of the same.

One of the primary objects of this invention is to provide a fastening device for securing a windshield wiper assembly for an automotive vehicle windshield to the body sheet metal in a manner which inhibits the inadvertent loosening up of the apparatus.

Another object of this invention is to provide apparatus of the class described which requires the use of a tool to tighten the device on the vehicle sheet metal, thereby preventing any hand assembly by an assembly line worker which might result in a loose connection.

Another object of the invention is to provide apparatus such as described which does not require the assembly line operator to hold the lower portion of the collar against the sheet metal during fastening of the nut on the upper portion thereof.

Still another object of this invention is to provide a fastening device of the class described which is simple and economical in construction and effective in operation.

Other objects and advantages of this invention will be made apparent as the description progresses.

BRIEF DESCRIPTION OF THE DRAWINGS

In the accompanying drawings in which one of the various possible embodiments of the invention are illustrated, FIG. 1 is a fragmentary perspective of the vehicle body and windshield with a windshield wiper attached by apparatus of this invention shown below the windshield, certain parts being broken away for clarity;

FIG. 2 is an enlarged elevation, with certain parts in section, of a fastening apparatus of this invention;

FIG. 3 is a plan view of a washer construction in accordance with this invention;

FIG. 4 is a side elevation of the washer shown in FIG. 3;

FIG. 5 is a fragmentary view of FIG. 2 with the washer shown in FIGS. 3 and 4 shown in place prior to the addition of a nut to the assembly;

FIG. 6 is a section taken along line 6—6 of FIG. 2;

FIG. 7 is a view similar to FIG. 5 with a nut being shown threaded onto the upper portion of the collar in a final position.

Like parts are shown by corresponding reference numerals throughout the drawings.

DESCRIPTION OF THE PREFERRED EMBODIMENT

Referring now to FIG. 1 an automotive vehicle is generally indicated at 1 and includes a windshield 3 mounted in the vehicle body 4. A windshield wiper assembly, generally indicated at 5, is connected to body sheet metal 7 and to a linkage assembly generally indicated at 9 connected to an operating mechanism (not shown). The windshield wiper assembly 5 is connected to the linkage 9 by a coupling assembly 11.

The coupling assembly includes a main body or housing portion 13, a rotatable shaft 15 extending through the body 13 and a knurled cap 17 secured to the end of the rotatable shaft 15. Body 13 includes a lower portion 19, a threaded portion 21 and a tubular sleeve portion 23 extending upwardly from the threaded portion 21. The lower portion 19 has a flange 25 on the upper end thereof which is adapted to be located against the lower surface of the sheet metal 7. The threaded portion 21 extends upwardly through an opening 27 in the body sheet metal 7. The opening 27 and the threaded portion 21 both include flat portions 29 and 31 which mate to prevent turning of the coupling member assembly in the opening.

Shaft 13 is rotatably mounted in body 19 and threaded portion 21 by a bushing 33 which is located in counterbored section 35 of a bore 37 extending through the body 13, threaded portion 21 and tubular sleeve 23. The upper end of the shaft 15 is peened or flattened over the knurled cap 17 so that the latter will rotate with the shaft. The lower end of shaft 15 has an enlarged head 39 staked, as by welding, for example, to one end of a pivot link 41. A wave washer 43 is located between the upper face of link 41 and the end of bushing 33. The other end of pivot length 41 has a ball 45 thereon adapted to be connected to a drive link 47.

An elongated longitudinally extending slot 49 is formed or cut in the threaded portion 27 from the upper face of flange 25 to a point slightly below the upper edge of the threaded portion 27, thereby forming a stop 51. The locking washer 53 of this invention includes a flat ring portion 55 and a tapered locking finger portion 57 extending upwardly from the inner edge of the ring 55. The taper extends radially inwardly from ring 55 to the upper end of the locking finger 57. The inside diameter of ring 55 is slightly larger than the diameter of the threaded portion to permit the ring to slip over such portion.

The locking washer 53 and the coupling assembly are installed in the following manner:

First, the assembly is pushed upwardly through the opening 27 to the FIG. 2 position. Locking washer 53 is slipped over the threaded portion 21 with the tapered portion 57 aligned with the slot 49. The ring is pressed against sheet metal 7 and the upper end of the tapered portion 57 snapped under the stop 51. The outer end of the tapered portion 57 is no thicker than the depth of slot 49 and the portion 57 has a width throughout its length which is no greater than the width of slot 49. This secures the unit in place and the installer may release his grip on body 11 without fear of dropping the unit. The unit is then in the position shown in FIG. 5.

A nut 95 is then applied to threaded portion 21. However, the tapered portion 57 prevents the nut from being tightened by hand. Thus, a power tool, such as an automatic torque wrench, for example, must be applied to the nut to turn the same down until it engages the ring 55. The portion of the tapered section outside the diameter of the threaded portion 21 is squeezed upwardly and tightly in the slot 49. The wedging action is so effective that the nut cannot be removed by hand and a wrench must be employed to remove the same.

The locking washer thus accomplishes the several objects desired. It relieves the installer of the necessity of holding the lower portion of the assembly while the nut is applied to the upper end thereof. The washer also renders it impossible to hand tighten the nut, thereby requiring the use of a wrench which is more likely to insure adequate tightening of the nut. In addition, once the nut is tightened the resistance offered by the compressed tapered portion of the washer prevents any inadvertent vibratory removal as well as any manual removal of the nut. The washer also provides an effective seal around the hole 29 which inhibits the flow of moisture through the opening.

In view of the foregoing it will be seen that the several objects of this invention are achieved.

Although only one embodiment of the invention has been disclosed and described, it is apparent that other embodiments and modifications of the invention are possible.

I claim:

1. Apparatus for connecting an automotive vehicle windshield wiper to a structural member of vehicle comprising a coupling assembly adapted to extend through an opening in said structural member, said coupling including a tubular unit having an enlarged portion adapted to be located on the lower side of said structural member, a threaded portion extending from said enlarged portion and adapted to extend through said opening, a rotatable member extending through said tubular unit and adapted to be connected at its upper end to said wiper and at its lower end to an actuating assembly, said threaded portion having a slot therein, a deformable washer having a ring portion surrounding said threaded portion and a tapered finger extending from said ring portion and being located in said slot, a nut threaded on said threaded portion, said finger having a portion thereof deformable by said nut as the latter is moved toward said enlarged portion, said deformable portion inhibiting the removal of said nut when the latter is threaded onto said threaded portion, a portion of said threaded portion closing the upper end of said slot and forming a stop against which the upper end of said finger abuts.

2. Apparatus for connecting an automotive vehicle windshield wiper to a structural member of vehicle comprising a coupling assembly adapted to extend through an opening in said structural member, said coupling including a tubular unit having an enlarged portion adapted to be located on the lower side of said structural member, a threaded portion extending from said enlarged portion and adapted to extend through said opening, a rotatable member extending through said tubular unit and adapted to be connected at its upper end to said wiper and at its lower end to an actuating assembly, said threaded portion having a slot therein, a deformable washer having a ring portion surrounding said threaded portion and a tapered finger extending from said ring portion and being located in said slot, a nut threaded on said threaded portion, said finger having a portion thereof deformable by said nut as the latter is is moved toward said enlarged portion, said deformable portion inhibiting the removal of said nut when the latter is threaded onto said threaded portion, said slot extending axially along said threaded portion, a portion of said threaded portion closing the upper end of said slot and forming a stop against which the upper end of said finger abuts.

3. Apparatus for connecting an automotive vehicle windshield wiper to a structural member of vehicle comprising a coupling assembly adapted to extend through an opening in said structural member, said coupling including a tubular unit having an enlarged portion adapted to be located on the lower side of said structural member, a threaded portion extending from said enlarged portion and adapted to extend through said opening, a rotatable member extending through said tubular unit and adapted to be connected at its upper end to said wiper and at its lower end to an actuating assembly, said threaded portion having a slot therein, a deformable washer having a ring portion surrounding said threaded portion and a tapered finger extending from said ring portion and being located in said slot, a nut threaded on said threaded portion, said finger having a portion thereof deformable by said nut as the latter is moved toward said enlarged portion, said deformable portion inhibiting the removal of said nut when the latter is threaded onto said threaded portion, said threaded portion having a generally circular cross section throughout its length, said tapered finger being thickest at its end adjacent said ring and being thinnest at its opposite end, the tapered finger being thicker adjacent said ring than the depth of said slot and no thicker at said opposite end than the depth of said slot and located within said slot, said finger having a width throughout its length which is no greater than the width of said slot.

* * * * *